Sept. 27, 1966  J. W. McCLUNE ETAL  3,275,829
CAVITY RADIATOR WITH A PYROTECHNIC CHARGE THAT REMAINS
INTACT DURING AND AFTER COMBUSTION
Filed Aug. 15, 1960  2 Sheets-Sheet 1
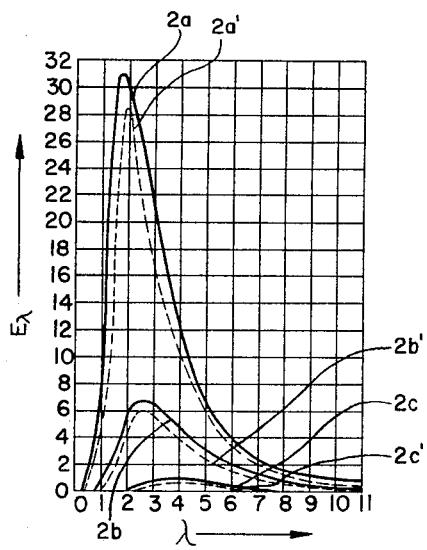
FIG. 1.
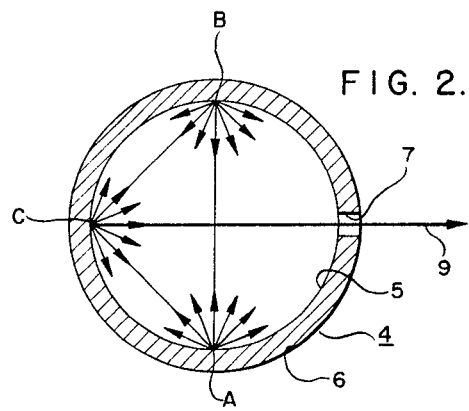
FIG. 2.
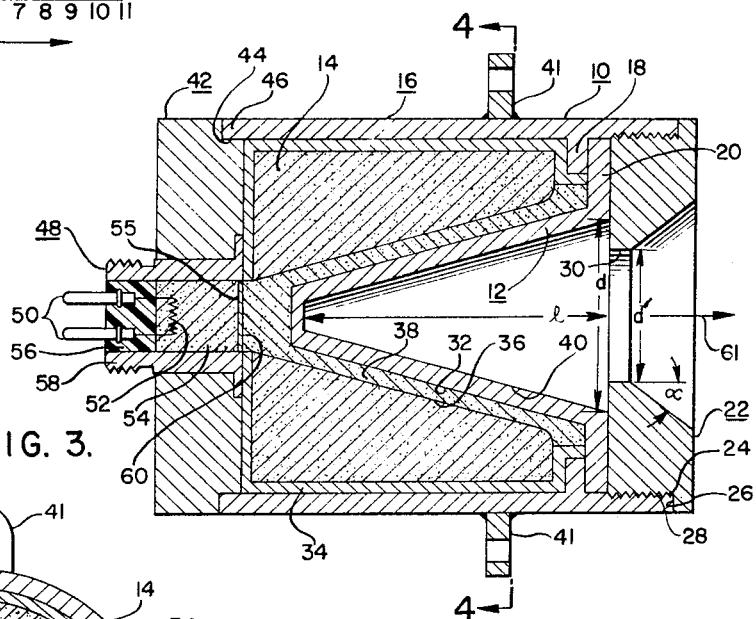
FIG. 3.
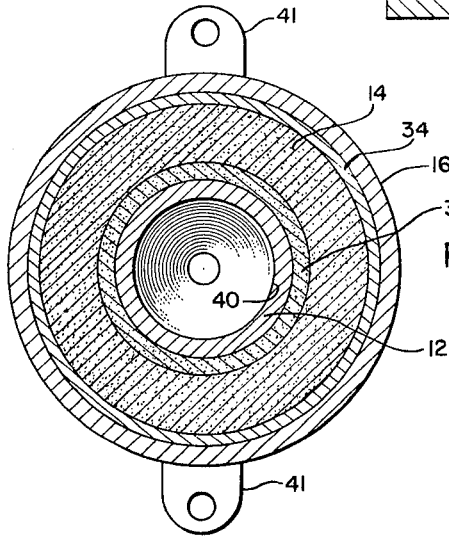
FIG. 4.
JAMES W. McCLUNE
WILLIAM F. GREEN
INVENTORS
ATTORNEY

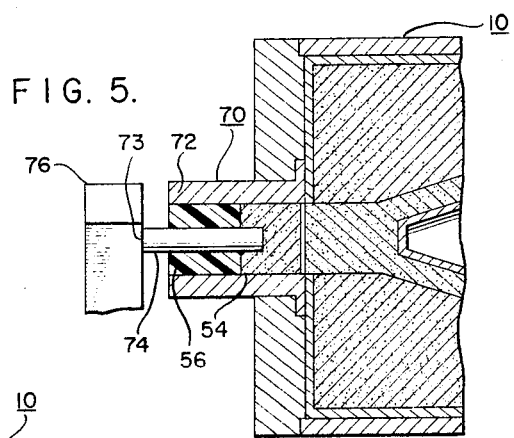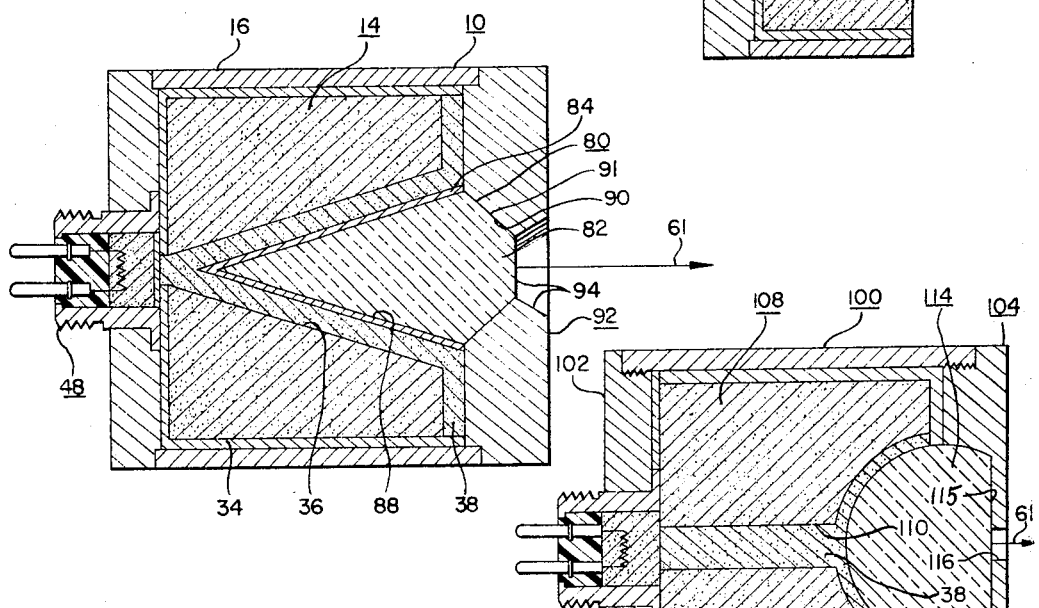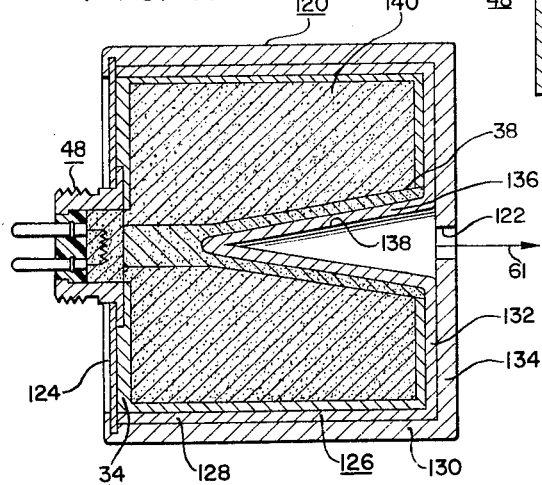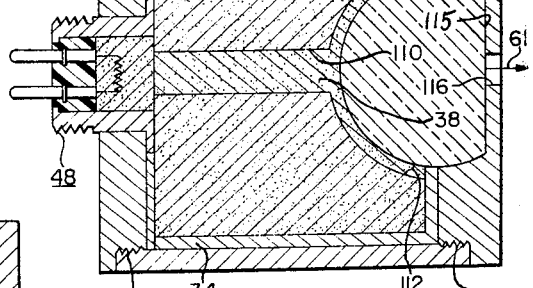

United States Patent Office 3,275,829
Patented Sept. 27, 1966

3,275,829
CAVITY RADIATOR WITH A PYROTECHNIC CHARGE THAT REMAINS INTACT DURING AND AFTER COMBUSTION
James W. McClune, Torrance, and William F. Green, Van Nuys, Calif., assignors to Special Devices, Inc., San Fernando, Calif., a corporation of California
Filed Aug. 15, 1960, Ser. No. 49,575
42 Claims. (Cl. 250—85)

This invention relates to the electromagnetic radiation emission art and more particularly to improved method and means for emitting electromagnetic radiation having energy in the infrared and visible wavelengths of the electromagnetic spectrum.

In many applications, such as instrument calibration, missile tracking, infrared simulators and targets and the like, it is desirable to have an electromagnetic radiation emission source wherein the amount of energy emitted at any specified wavelength is accurately known. In airborne applications it is also desirable that the emitter be light weight and low in cost and emit strongly in certain preselected wavelengths. The laws governing the emission of electromagnetic radiation from heated sources are well known and are termed the black body laws. A source that would emit radiation exactly in accordance with these laws at all temperatures and over all wavelengths is generally termed a black body source. Unfortunately, a true black body source has not yet been found to exist. However, some substances under certain conditions and in certain environments have been found to be what is termed gray bodies: that is, within certain temperature ranges, and over a range of specific wavelengths, such bodies emit a known percentage of the black body emission.

One form of gray body is termed a cavity radiator wherein a substance is formed in the shape of a cavity radiation emission source with opaque walls. The inside surface of the cavity is heated to a predetermined temperature. When the heated inside surface of the cavity radiation emission source is exposed to regions external the cavity radiator through a small aperture in one of the walls bounding the cavity radiation emission source and radiation is emitted through the aperture to those regions exterior the cavity radiator, this radiation may be 99% of the black body emission, for the predetermined temperature, over a substantial wavelength bandwidth. These cavity radiators are generally heated by electrical energy and are comparatively heavy, bulky, expensive, and limited in maximum obtainable temperature to values less than 800° K. Therefore, while satisfactory for certain limited laboratory operations, they are generally unsuitable for airborne applications or field testing and calibration, and, in particular, where a great amount of energy is required from a limited area.

Infrared sources utilized in airborne and space applications in the past have generally utilized pyrotechnic flares of various compositions. Such flares, even though they have a high total electromagnetic radation emission rate, have been found unsatisfactory in many instances. The electromagnetic radiation emission is not gray body over an appreciable wavelength bandwidth and the emission is pressure sensitive, thus tending to vary with altitude. Also, solid burning particles and smoke are often ejected during operation which tends to obscure related optical systems, attenuate the signal, and prohibit modulation of the emitted infrared energy.

Accordingly, it is an object of this invention to provide a compact gray body electromagnetic radiation emission source.

It is another object of this invention to provide a light weight and low cost cavity radiator.

It is yet another object of this invention to provide a cavity radiator that is substantially free of external power requirements for operation.

It is still another object of this invention to provide an airborne gray body infrared source wherein the infrared emission is independent of altitude, is free of solid particle and smoke ejection, and whose energy may be modulated without attenuation of signal strength.

It is another object of this invention to provide a cavity radiator that achieves a preselected very high temperature for radiation in a very short time.

The above objects and others are accomplished according to this invention by providing an hermetically sealed pyrotechnically activated cavity radiator. In one embodiment a generally hollow conical shell of a suitable electromagnetic radiation emitting substance, such as carbon, is coaxially aligned with, and enclosed in, a cylindrical metallic case. The case is sealed on one end by a metallic closure disc having an aperture aligned with the open end of the conical shell so as to expose the inside conical surface. The inside conical surface forms the cavity radiation emission source surface. The other end of the cylindrical case is sealed with an end plate that incorporates a squib means oriented to discharge into preselected volumes on the interior of the case. Intermediate the surface of the conical shell and the cylindrical case is a suitable gasless pyrotechnic mixture charge, such as thermite, that provides a source of thermal energy. A combustion inhibitor is intermediate preselected surface areas of the pyrotechnic charge and the case, the end plate, and the closure disc. A small volume between the pyrotechnic charge and the conical shell and contiguous with the squib means is filled with a suitable primer mix.

When the squib is energized by either a low power electrical impulse, which typically may be ½ amp at 3 volts D.C., or by parasitic ignition, hot particles are directed from the squib to ignite the primer mix. The pyrotechnic charge is then ignited by the primer mix and burns at a high temperature from areas adjacent to the outside surface of the conical shell radially outwardly toward the case. Thermal energy is transferred from the deflagrating pyrotechnic charge to the conical shell which rapidy increases in temperature to temperatures approaching the high combustion temperature of the pyrotechnic charge. Electromagnetic radiation is emitted through the aperture to regions exterior the cavity radiator from the now hot inside conical surface. This is the cavity radiation emission source surface and the electromagnetic radiation thus emitted is gray body of approximately 99% or better of true black body radiation over at least both the visible and infrared wavelength for the temperature of the cavity radiation emission source.

In another embodiment of this invention the hollow conical shell is replaced by a solid cone of a material transparent to at least certain preselected wavelengths of electromagnetic radiation. An outside conical surface of the solid cone is coated with a very thin layer of a preselected electromagnetic radiation emitting substance such as chromic oxide. The solid cone may be of a high melting point material such as fused quartz or sapphire. When the chromic oxide is heated by a deflagrating pyrotechnic charge as described above, electromagnetic radiation is emitted out of the base of the solid cone, which is aligned with an aperture, and thence to regions exterior the cavity radiator. This embodiment provides a very rapidly heating cavity radiator with an emission approaching 99.9% of a true black body over the preselected wavelengths region for which the solid cone is transparent.

These and other embodiments of the invention are explained in more detail in the following specification taken together with the accompanying drawing wherein like reference characters indicate similar elements throughout, and in which:

FIGURE 1 is a graph showing the relative black body emission as a function of wavelength for various temperatures;

FIGURE 2 is a schematic representative of a cavity radiator;

FIGURE 3 illustrates the cavity radiator structure associated with one embodiment of this invention;

FIGURE 4 shows a view of the embodiment illustrated in FIGURE 3 taken along the line 4—4;

FIGURE 5 illustrates a parasitic ignition arrangement useful in this invention;

FIGURE 6 illustrates the structure associated with a transparent cone cavity radiator embodiment of this invention;

FIGURE 7 illustrates the structure associated with another embodiment of this invention; and FIGURE 8 illustrates another embodiment of this invention.

The physical laws defining the emission of thermal energy for a perfect black body are known and are expressed by Planck's equation:

$$E_\lambda = \frac{K_1 \lambda^{-5}}{e^{K_2/\lambda T} - 1} \quad (1)$$

where:
$E_\lambda$ = monochromatic emissive power of a black body
$\lambda$ = wavelength
$T$ = absolute temperature
$e$ = 2.718
$K_1, K_2$ = constants.

FIGURE 1 shows a graph, plotted according to Equation 1, for several different values of T. From these curves, illustrated by solid lines $2a$, $2b$, and $2c$, it can be seen that as the temperature increases the peak of the monochromic emissive power shifts to shorter wavelengths and also that the total energy in any given wavelength bandwidth increases with increasing temperature. It appears, then, that for a given radiating area, the higher the temperature the more radiation emitted at all wavelengths.

As mentioned previously, while no real substance has been found that follows the black body emission laws at all temperatures and over all wavelengths, under certain conditions radiation has been obtained from a particular radiating source that approaches true black body emission. Such a radiation source is termed a gray body. FIGURE 1 also shows dotted curves $2a'$, $2b'$, and $2c'$ of monochromatic emissive power for gray bodies taken at the same temperature as for the curves $2a$, $2b$, and $2c$, respectively. For such gray bodies the percentage of black body emission is constant over the wavelength region of interest.

One technique for obtaining gray body emission of electromagnetic radiation wtih a very high percentage of black body emission is by a cavity radiator. FIGURE 2 shows a schematic sectional representation of a cavity radiator. The enclosure 4 may take the form of an opaque hollow sphere having an inside surface 5 and an outside surface 6. There is a small aperture 7 in the enclosure 4. When the inside surface 5 of the enclosure 4 is heated to a temperature T, electromagnetic radiation is emitted from all points on the inside surface 5 and in all directions. Such radiation is diffusedly reflected from all points on the inside surface 5. Thus, radiation emanating from point A travels in all directions and some of it falls on point B and some on point C. A similar effect takes place for radiation emanating from point B and point C. The entire inside surface 5 is of a uniform temperature T and therefore there is no net heat transfer between the points, such as A, B, and C, on the inside surface 5. Just as much radiation is emitted from each point as is absorbed, except for the small amount of radiation 9 escaping to regions external the cavity radiator (enclosure 4) through the aperture 7. Consequently, the radiation 9 deviates by only a small amount from true black body radiation for the temperature T. As the size of the aperture 7 is decreased with respect to the amount of internal surface area 5, the radiation 9 approaches black body radiation more closely. Practical, a ½ inch diameter hole in the end of a hollow, opaque cylindrical tube 8 inches long and 2 inches in diameter provides better than 99% of true black body emission.

In this invention a cavity radiator is provided that is compact and comparatively inexpensive. FIGURE 3 illustrates the structure associated with one embodiment of this invention. A pyrotechnically activated cavity radiator 10 includes a right circular hollow conical shell 12 and a pyrotechnic charge 14 within a housing 16. The conical shell 12 is the cavity radiation source of the cavity radiator 10. The interior of the housing 16 is provided with an annular shoulder 18 near an end portion thereof for supporting a flange portion 20 of the conical shell 12. A closure disc 22 is provided with an annular groove portion 24 adapted to receive one end portion 26 of the housing 16. The closure disc 22 may be attached to the housing 16 by, typically, screw thread means 28 and be sealed thereon.

The closure disc 22 has a aperture 30 which, for example, may be circular in shape. The aperture 30 is concentrically aligned with the shell 12. The aperture 30 may be broadened to a frustro-conical shape by an angle α to obtain a predetermined radiation emission pattern. It will be appreciated that the closure disc 22 with the aperture 30 comprise a shielding means in the cavity radiator 10 that limits the emission of electromagnetic radiation generated in the interior of the cavity radiator 10 to pass only through the preselected small area of the aperture 30 to regions exterior the cavity radiator 10. The pyrotechnic charge 14 occupies most of the volume that is interior of the housing 16 and is adjacent to an outside surface portion 32 of the shell 12. The pyrotechnic charge may, for example, be a thermite, such as a mixture of aluminum and ferric oxide, and may have a combustion temperature on the order of 3200 degrees Kelvin. Other mixtures suitable for the pyrotechnic charge 14 may include a mixture of aluminum and tungstic oxide and a mixture of zinc and manganese disulphide. A small volume between the housing 16 and the pyrotechnic charge 14 is filled with a combustion inhibitor 34 which may be a ceramic cement. A volume on the interior of the cavity radiator 10 that lies between a surface portion 36 of the pyrotechnic charge 14 and the surface 32 of the shell 12 is filled with a primer mix 38. The composition of the primer mix 38 may be varied depending on the particular operational requirements of the cavity radiator 10. The main function of the primer mix 38 is to ignite the surface portion 36 of the pyrotechnic charge 14 as rapidly and uniformly as possible. To accomplish this, a typical primer mix may be made of a mixture of boron and barium chromate or a mixture of a zirconium-nickel alloy and barium chromate.

An inside surface portion 40 of the conical shell 12 is the cavity electromagnetic radiation source surface of the cavity radiator 10. The flange portion 20 of the shell 12 abuts and is sealed against the closure disc 22. The inside surface portion 40 of the shell 12 may be roughened to enhance the degree of black body radiation actually emitted through the aperture 30. The roughening of this surface portion 40 induces an effect analogous to that described in connection with the cavity radiator of FIGURE 2. The length $l$ and diameter $d$ of the shell 12 (when the shell 12 is conical in form as shown) that are required to provide a high percentage of black body emission for a given diameter $d'$ of the aperture 30 depend on the basic radiation emission characteristics of the surface 40. Generally, the closer this basic emission is to black body emission, the shorter the dimensions have to be.

FIG. 4 is a sectional view of the embodiment shown on FIG. 3 and taken along the line 4—4. This view shows the cavity radiator 10 as circular in cross section. It will be appreciated that other geometrical shapes may equally well be utilized. For example, the housing 16 could be rectangular in cross section and the shell 12 could be fabricated in a hollow spherical or a cylindrical shape. Thus, many basic shapes and geometrics as well as combinations thereof of the various components might be utilized. Mounting lugs 41 may be included on the housing 16 to facilitate installation of the cavity radiator 10.

An end plate 42 includes an annular groove 44 that is connected to an end portion 46 of the housing 16 and provides a hermetic seal thereon. A small volume between the pyrotechnic charge 14 and the end plate 42 is filled with a combustion inhibiting material such as the ceramic cement 34. A squib means 48 is connected to the end plate 42 and is sealed thereto. One type of squib means that may be utilized is an electrically energized squib, such as that illustrated on FIG. 3. In this type squib, electrical contacts 50 are electrically coupled to a bridge wire means 52 which is imbedded in an ignitable charge 54 and sealed by a seal means 55. An electrical insulation means 56 both insulates the electrical contacts 50 and also seals the ignitable charge 54 within the squib housing 58.

Primer mix 38 fills a volume between the squib discharge 60 and the shell 12. This volume of primer mix is contiguous with the primer mix 38 occupying the volume between the shell 12 and the pyrotechnic charge 14. The housing 16, closure disc 22, and end plate 42 must be made of a high melting temperature material such as steel, titanium, and the like.

In operation, electric power, which as stated previously may be as low as ½ amp at 3 volts D.C. for a few milliseconds, is applied to the contacts 50 which heats the bridge wire 52. Heat is transferred from the bridge wire 52 to the ignitable charge 54 which then ignites. When the ignitable charge 54 ignites, hot particles are ejected from the squib means 48 through the squib discharge 60, rupturing the seal means 55 and impinging on the primer mix 38 which is thus ignited. While the initial ignition of the primer mix 38 is adjacent to the squib discharge 60, extremely rapid deflagration of the primer mix 38 occurs and substantially all of the primer mix 38 is ignited within less than a millisecond of the initial ignition. The heat of combustion of the primer mix 38 ignites the pyrotechnic charge 14 along the surface portions 36 thereof. The pyrotechnic charge 14 then progressively burns from the surface portion 36 radially outwardly toward the housing 16, thereby generating thermal energy.

The combustion inhibitor 34 prevents combustion along other surface portions of the pyrotechnic charge 14. It will be appreciated that the chemical reactions associated with the combustion of the ignitable charge 54, primer mix 38, and pyrotechnic charge 14 are substantially gasless and also exothermic. In addition, the chemical reactions that occurs during the combustion of the ignitable charge 54, primer mix 38, and the pyrotechnic charge 14 are independent of ambient environment and require no oxygen from the surroundings in order to burn completely. The reactions take place equally well in a vacuum. The pyrotechnic charge 14 may also be a fluid as well as a solid such as the thermite previously described.

In the preferred embodiment of this invention the pyrotechnic charge 14 includes a typical binding agent, such as the epoxy based resins, so that the charge 14 remains intact during and after combustion. When this type pyrotechnic charge is used, the charge undergoes a slight thermal expansion during operation and essentially fills all voids on the interior of the cavity radiator, thereby substantially retaining its initial shape. By thus remaining intact, transfer of thermal energy to the cavity radiation source is enhanced.

Thermal energy is released during the exothermic deflagration of the pyrotechnic charge 14 and is transferred from the burning pyrotechnic charge 14 to the outer surface 32 of the shell 12 which rapidly increases in temperature to temperatures approaching the combustion temperature of the pyrotechnic charge 14. Heat is transferred from the outer surface 32 of the shell 12 through the thickness of the shell 12 to the inner surface 40 of the shell 12. By a proper selection of the shell 12 material and the thickness thereof, temperature differences between the outer surface 32 and the inner surface 40 are minimized. The shell 12 should have a high thermal conductivity and, for rapid heating, a low thermal capacity, as well as a high electromagnetic radiation emissivity from the surface portion 40. Thus, in addition to carbon, other materials such as silicon carbide, chromic oxide, and the like could also be utilized for the shell 12. Even after combustion of the pyrotechnic charge 14 is complete, thermal energy will continue to be transferred to the surface portion 32, and thence to the surface portion 40 of the shell 12 as long as the products of combustion of the pyrotechnic charge 14 are at a higher temperature than the surface 32.

Electromagnetic radiation is emitted from the surface portion 40 of the shell 12 and some of this radiation, illustrated by line 61, escapes through the aperture 30 to regions exterior the cavity radiator 10. As described previously in connection with FIG. 2, this is essentially gray body radiation which, spectrally, may be 99%, or higher, of true black body radiation.

In some applications, even the small amount of external electric energy required to fire the squib means 48 may not be available. In such application this invention may be practiced by utilizing as an ignition means parasitic ignition from a hot surface such as a rocket motor nozzle. A parasitic ignition squib means is illustrated in FIG. 5. The parasitic squib means 70 includes a casing 72, a charge 54, and a transfer rod 74. The transfer rod 74 is utilized to transfer heat from a hot surface 76 to the charge 54. An insulation means 56 bonds the rod 74 in place and also seals the charge 54 within the casing 72. An end portion 73 of the rod 74 is abutted to the surface 76 which, for example, may be a rocket motor nozzle. When the surface 76 increases in temperature due, for example, to the rocket motor being operated, heat is transferred along the rod 74 to the charge 54. This ignites the charge 54 and initiates operation of the cavity radiator 10 in the manner described in connection with the embodiment of FIG. 3. Such parasitically fired squib means may be utilized in any of the embodiments of this invention. Thus, while the descriptions of the embodiments of this invention are illustrated as including an electrically fired squib means, the parasitically fired squib means could also be utilized. It will be appreciated that many other types of ignition means could also be utilized in the practice of this invention to initiate the operation of the cavity radiator 10.

In the embodiment shown on FIG. 3, the shell 12 must be sufficiently thick so as to remain substantially intact and self supporting. As a result, there is some finite, though small, delay while heat is transferred from the surface portion 32 to the surface portion 40. This invention may also be utilized in an embodiment where there is substantially no time delay. Such an embodiment is shown on FIG. 6. A coated cone means 80 replaces the conical shell 12 of FIG. 3. The cone means 80 includes a conical portion 82 and a coating 84. The conical portion 82 may be made of a transparent, high melting temperature substance such as fused quartz or sapphire. If the conical portion 82 is not equally transparent to energy in all wavelengths of electromagnetic radiation, then the radiation emitted from this embodiment will only be essentially black body for those portions of the spectrum where it is transparent. Thus, if fused quartz is utilized for the conical portion 82 the radiation emitted will approach black body only for wavelengths up to approximately 3.5 microns, as longer wavelengths are absorbed by the fused quartz. Similarly, sapphire (including artificial or man-made sapphire) will provide essentially black body radiation for wavelengths up to approximately 9.5 microns.

A conical surface 88 of the conical portion 82 has a coating 84 of a thin layer of an electromagnetic radiation emitting material. This coating 84 is kept very thin in order to reduce the time required for the coating to increase in temperature. The coating material 84 may be chromic oxide, aluminum oxide, or other high melting temperature, electromagnetic radiation emitting materials. For chromic oxide, thicknesses less than 2 microns have been found to be somewhat transparent and therefore do not provide the basic requirement of opacity necessary for a cavity radiator's emitting surface. Thus, for chromic oxide a thickness between 2 and 4 microns for the coating 84 has been found to provide opacity, rapid heating, and good radiation characteristics. A coating 84 of 2 to 4 microns in thickness of chromic oxide can be deposited on the conical surface 88 by, for example, vacuum deposition or other well known techniques.

The cone means 80 is sealed along a tapered surface portion 90 thereof to a matching tapered surface 91 of a closure plate means 92. An aperture 94 in the closure plate 92 provides means for allowing electromagnetic radiation to be emitted to regions exterior the cavity radiator 10. It will be appreciated that the conical portion 82 of the cone means 80 need not be sealed as shown in FIG. 5. For example, the coating 84 could be extended to cover the tapered portion 90. Also, a shape equivalent to a hollow conical shell, similar to the shape of the shell 12 of FIG. 3, could be utilized instead of the cone shape shown. The coating would still be placed on the surface portion 88 adjacent a pyrotechnic charge 14 and contiguous with a primer mix 38. In a like manner, a transparent body in a spherical shape could be utilized.

The operation of this embodiment of the invention shown in FIG. 6 is similar to that described in connection with the embodiment of FIG. 3. A squib means 48 is energized and ignites the primer mix 38 which ignites the surface portion 36 of the pyrotechnic charge 14. The pyrotechnic charge deflagrates progressively radially outwardly toward a housing 16 and thermal energy thereby generated is transferred to the coating 84. As the coating 84 is very thin, it increases in temperature substantially instantaneously to approximately the combustion temperature of the pyrotechnic charge 14. Electromagnetic radiation is emitted from the coating 84 and is transmitted through the transparent solid cone portion 82 and is diffusely reflected from other portions of the coating 84. Some of this electromagnetic radiation 61 does escape through the aperture 94. This radiation 61 is a gray body approaching 99.9% of true black body radiation over the wavelength bandwidth for which the solid conical portion 82 is transparent.

As described above, roughening of the cavity radiation emission source surface tends to enhance the black body characteristics of the emitted radiation 61. In the embodiment shown on FIGURE 6, the roughening effect may be achieved by roughening the conical surface 88 of the solid conical portion 82 before the coating 84 is applied. As the coating 84 is applied to the surface 88 it follows the contours thereof and thus presents a roughened surface for the emission of radiation.

The primer mix 38 is described as part of the cavity radiator ignition system for the various embodiments of this invention. It will be appreciated, however, that in certain applications the primer mix 38 may be eliminated. In such an arrangement the hot particles emitted from the squib means 48 are directed to impinge upon a preselected surface portion of the pyrotechnic charge 14. The hot particles from the squib are thus utilized to ignite the pyrotechnic charge 14 directly without the utilization of an intermediate ignition agent such as the primer mix 38. Such an arrangement is applicable to all embodiments of this invention.

In another embodiment of this invention the deflagrating pyrotechnic charge itself forms the cavity electromagnetic radiation source for emitting electromagnetic radiation. This embodiment is shown in FIG. 7. A housing 100, which may be cylindrical, is sealed to an end plate 102 and closure disc 104 by screw thread means 106. A pyrotechnic charge 108 is enclosed within the housing 100. The pyrotechnic charge 108 has an interior surface portion 110 that forms a generally centrally located core which, together with a second interior surface portion 112 of the pyrotechnic charge 108, form the cavity radiation emission source surface for the emitted electromagnetic radiation 61. The closure disc 104 is adapted to receive a transparent member 114 and is sealed thereto.

The transparent member 114 has an edge portion 115 that together with the closure disc 104 form an aperture 116 for the emission of electromagnetic radiation 61. A primer mix 38 is placed in the core formed by the surface portion 110 of the pyrotechnic charge 108 and also between the surface portion 112 and the transparent member 114. A combustion inhibitor 34 is placed between the pyrotechnic charge 108 and preselected inside surface portions of the housing 100 and also between the pyrotechnic charge 108 and both the closure disc 104 and the end plate 102. The end plate 102 is adapted to receive a squib means 48 which is oriented to discharge into the primer mix 38.

When the primer mix 38 is ignited by the squib means 48, surface portions 110 and 112 of the pyrotechnic charge 108 are in turn ignited. Electromagnetic radiation is emitted from these surface portions and some of this radiation (indicated by the line 61) leaves through aperture 116. As described previously, this radiation is gray body and may be in excess of 99.9% of true black body for the combustion temperature of the pyrotechnic charge 108 over the spectral range for which the transparent member 114 is transparent to electromagnetic radiation. As described previously, the transparent member 114 may be fused quartz, sapphire, or the like.

The embodiment of FIGURE 7 provides a radiation output instantaneously upon ignition of the primer mix 38 and the radiation emission continues until the combusted pyrotechnic charge 108 is cooler than its surroundings.

While some of the embodiments of this invention are described as including a conical or tapered surface as forming the cavity radiation emission source surface, other geometric shapes could be utilized equally as well. For example, the hollow conical shell means 12 of FIGURE 3 could be replaced by a cylindrical shell open toward the aperture 30 and closed at the opposite end adjacent the squib means 48 with a cap of the same material as the shell 12. With the aperture 30 of the size described previously in connection with FIGURE 2, such a cylindrical shape would also emit gray body radiation of a high percentage of true black body radiation.

Another embodiment of this invention is illustrated on FIGURE 8. In this embodiment a housing means 120 may be formed from a single sheet metal stamping and incorporate an aperture 122 and may be adapted to be crimped and hermetically sealed on an end plate 124.

The end plate 124 is adapted to receive a squib means 48. A liner means 126 has edge portions 128 that are contiguous to wall portions 130 of the housing means 120. The liner means 126 also has end portions 132 that are contiguous to end portions 134 of the housing means 130. A generally conical portion 136 of the liner means 126 is coaxially aligned with the aperture 122. A surface portion 138 of the liner means 126 forms the cavity radiation emission source for generation of electromagnetic radiation. If desired, the liner means 126 may be bonded to the housing means 120. The liner means 126 is preferably fabricated from a material that is both a good emitter of electromagnetic radiation as well as a thermal insulator. A pyrotechnic charge 140 fills most of the volume interior of the liner means 126 except for a small volume adjacent the conical portion 136 and the squib means 48. This volume may be filled with a primer mix 38. The pyrotechnic charge 140 may be sealed with a combustion inhibitor 34 to the end plate 124 and the liner means 126.

The pyrotechnic charge 140 is ignited by the primer mix 38 and transfers thermal energy from its burning surface to the conical portion 136 of the liner 126. In addition, there is some conductive heat transfer from the pyrotechnic charge 140 to the liner 126, and thence to the conical portion 136, along those surfaces of the liner 126 that are contiguous to the pyrotechnic charge 140. The insulating properties of the liner 126 prevent combustion of the housing 120 while its radiation emission properties provide gray body radiation 61 that is emitted from the aperture 122. This emitted radiation is a high percentage of true black body radiation. In some applications of this invention it may be desired to limit the spectral content of the radiation emitted from the cavity radiator. This can be accomplished by including appropriate filter means (not shown) coupled to, for example, the aperture through which the radiation is emitted. This would reduce the spectral content of the emitted electromagnetic radiation to those wavelengths for which the filter is transparent.

It is apparent from the above that a new and useful type of compact cavity radiator has been disclosed. Those skilled in the art may find many variations and adaptations of this invention and therefore the above description and the accompanying drawings are intended to be illustrative only.

What is claimed is:

1. In a cavity radiator the improvement comprising, in combination: a pyrotechnic charge remaining substantially intact during and after combustion, means for igniting said pyrotechnic charge, an opaque cavity electromagnetic radiation emission source surface means in heat transfer relationship to said pyrotechnic charge for emitting electromagnetic radiation, and shielding means having walls defining an aperture oriented with respect to said cavity electromagnetic radiation emission source surface means for transmitting said electromagnetic radiation through said aperture.

2. In a cavity radiator, the improvement comprising, in combination: a pyrotechnic charge means for generating thermal energy having preselected ignitable surface portions and remaining intact during and after combustion, a primer mix contiguous said preselected surface portions of said pyrotechnic charge, electrically fired squib means for igniting said primer mix and in ignition relationship thereto, an opaque cavity electromagnetic radiation emission source means having a predetermined surface portion for emitting electromagnetic radiation and in heat transfer relationship to said pyrotechnic charge, shield means having walls defining an aperture oriented in radiation transmission relationship to said predetermined surface portion of said cavity electromagnetic radiation emission source means for transmitting said electromagnetic radiation through said aperture, and said aperture having an area substantially smaller than the area of said predetermined surface portions of said cavity electromagnetic radiation emission source means.

3. In a cavity radiator, the improvement comprising, in combination: a pyrotechnic charge having preselected ignitable surface portions for generating thermal energy and remaining intact during and after combustion, an electrically fired squib means in ignition relationship to said preselected ignitable surface portions of said pyrotechnic charge for igniting said pyrotechnic charge, an opaque cavity, electromagnetic radiation emission source surface means for emitting electromagnetic radiation and in thermal energy transfer relationship to said pyrotechnic charge, shield means having walls defining a generally circular aperture and said aperture is aligned with said cavity electromagnetic radiation emission source surface means to transmit said electromagnetic radiation through said aperture and the area of said aperture is substantially smaller than the area of said preselected surface portions.

4. In a cavity radiator, the improvement comprising, in combination: a pyrotechnic charge means having preselected ignitable surface portions and for generating energy and remaining intact during and after combustion, a primer mix means for igniting said preselected ignitable surface portions and contiguous thereto, a squib means for igniting said primer mix and in ignition relationship thereto, cavity electromagnetic radiation emission source means in thermal energy transfer relationship to said pyrotechnic charge means and having walls defining a cavity radiation source surface, shield means having an aperture therein coupled to said cavity radiation source surface and said aperture having an area substantially smaller than the area of said cavity radiation source surface whereby only a small amount of electromagnetic radiation generated by said cavity radiation source surface passes through said aperture.

5. In a cavity radiator, the improvement comprising, in combination: a pyrotechnic charge means having preselected ignitable surface portions for generating thermal energy and remaining intact during and after combustion; a primer mix means for igniting said preselected ignitable surface portions and contiguous thereto; an electrically fired squib means for igniting said primer mix and in ignition relationship thereto; an electromagnetic radiation emission source means in thermal energy transfer relationship to said pyrotechnic charge means and having walls defining a cavity radiation source surface; shield means having an aperture therein coupled to said cavity radiation source surface and said aperture having an area substantially smaller than the area of said cavity radiation source surface whereby only a small amount of electromagnetic radiation generated by said cavity radiation source surface passes through said aperture.

6. In a cavity radiator, the improvement comprising, in combination: a pyrotechnic charge means having preselected ignitable surface portions for generating thermal energy and remaining intact during and after combustion; a primer mix means contiguous said preselected ignitable surface portions for igniting said preselected surface portions; a parasitically fired squib means for igniting said primer mix and in ignition relationship thereto; a cavity electromagnetic radiation emission source means in thermal energy transfer relationship to said pyrotechnic charge means and having walls defining a cavity radiation source surface; shield means having an aperture therein coupled to said cavity radiation source surface and said aperture having an area substantially smaller than the area of said cavity radiation source surface whereby only a small amount of electromagnetic radiation generated by said cavity radiation source surface passes through said aperture.

7. An a cavity radiator, the improvement comprising, in combination: a pyrotechnic charge means having preselected ignitable surface portions for generating thermal energy and remaining intact during and after combustion; a squib means for igniting said preselected ignitable surface portions and in ignition relationship thereto; a cavity electromagnetic radiation emission source means in thermal energy transfer relationship to said pyrotechnic charge means and having walls defining a cavity radiation source surface; shield means having an aperture therein coupled to said cavity radiation source surface and said aperture having an area substantially smaller than the area of said cavity radiation source surface whereby only a small amount of electromagnetic radiation generated by said cavity radiation source surface passes through said aperture.

8. In a cavity radiator, the improvement comprising, in combination: a pyrotechnic charge means having preselected ignitable surface portions for generating thermal energy and remaining intact during and after combustion; an electrically fired squib means for igniting said preselected ignitable surface portions and in ignition relationship thereto; a cavity electromagnetic radiation emission source means in thermal energy transfer relationship to said pyrotechnic charge and having walls defining a cavity radiation source surface; shield means having an aperture therein coupled to said cavity radiation source surface and said aperture having an area substantially smaller than the area on said cavity radiation source surface whereby only a small amount of electromagnetic radiation generated by said cavity radiation source surface passes through said aperture.

9. In a cavity radiator, the improvement comprising, in combination: a pyrotechnic charge means having preselected ignitable surface portions for generating thermal energy and remaining intact during and after combustion; a parasitically fired squib means for igniting said preselected ignitable surface portions and in ignition relationship thereto; a cavity electromagnetic radiation emission source means in thermal energy transfer relationship to said pyrotechnic charge means and having walls defining a cavity radiation source surface; shield means having an aperture therein coupled to said cavity radiation source surface and having an area substantially smaller than the area of said cavity radiation source surface whereby only a small amount of electromagnetic radiation generated by said cavity source surface passes through said aperture.

10. In a cavity radiator, the improvement comprising, in combination: a pyrotechnic charge means having preselected ignitable surface portions for generating thermal energy and remaining substantially intact during and after combustion; a primer mix means contiguous said preselected ignitable surface portions for igniting said preselected ignitable surface portions; ignition means for igniting said primer mix and in ignition relationship thereto; a cavity electromagnetic radiation emission source means in thermal energy transfer relationship to said pyrotechnic charge and having walls defining a cavity radiation source surface; shield means having an aperture therein coupled to said cavity radiation source surface and having an area substantially smaller than the area of said cavity radiation source surface whereby only a small amount of electromagnetic radiation generated by said cavity radiation source surface passes through said aperture.

11. In a cavity radiator, the improvement comprising, in combination: a pyrotechnic charge means having preselected ignitable surface portions for generating thermal energy and remaining substantially intact after combustion; ignition means for igniting said preselected ignitable surface portions and in ignition relationship thereto; a cavity electromagnetic radiation emission source means in thermal energy transfer relationship to said pyrotechnic charge means and having walls defining a cavity radiation source surface; shield means having an aperture therein coupled to said cavity radiation source surface and having an area substantially smaller than the area of said cavity radiation source whereby only a small amount of electromagnetic radiation generated by said cavity radiation source surface passes through said aperture.

12. A cavity radiator of the type adapted to emit gray body electromagnetic radiation comprising, in combination: a hollow conical shell member having walls defining an opaque inside conical surface portion, said inside conical surface portion adapted to generate electromagnetic radiation, and an outside conical surface portion; a pyrotechnic charge means having walls defining an ignitable surface portion, a peripheral surface portion, a first end surface portion and a second end surface portion, for generating thermal energy and remaining substantially intact during and after combustion; a thin layer of primer mix intermediate said ignitable surface portion of said pyrotechnic charge means and said outside conical surface portion of said shell member; a closure disc member adjacent said first end surface portion of said pyrotechnic charge means having walls defining a substantially circular aperture and said aperture coaxially aligned with said inside conical surface portion of said hollow conical shell member for transmitting electromagnetic radiation generated by said inside conical surface portion of said hollow conical shell member through said aperture; an end plate member adjacent said second end surface portion of said pyrotechnic charge means, a squib means coupled to said end plate member and in ignition relationship to said primer mix for igniting said primer mix; a housing means coupled to said end plate member and said closure disc member and adjacent said peripheral surface portion of said pyrotechnic charge means; and combustion inhibitor means intermediate said housing member and said peripheral surface portion of said pyrotechnic charge and intermediate said closure disc member, said end plate member and said first end surface portion and said second end surface portion respectively of said pyrotechnic charge means.

13. A cavity radiator as defined in claim 12 wherein said hollow conical shell member is carbon.

14. A cavity radiator as defined in claim 12 wherein said opaque inside conical surface of said hollow conical shell is roughened, thereby enhancing said electromagnetic radiation.

15. A cavity radiator as defined in claim 12 wherein said pyrotechnic charge member is a mixture of aluminum and ferric oxide.

16. A cavity radiator as defined in claim 12 wherein said combustion inhibitor means is a ceramic cement.

17. In a cavity radiator, the improvement comprising, in combination: a pyrotechnic charge means having preselected ignitable surface portions for generating thermal energy and remaining intact during and after combustion; a squib means coupled to said pyrotechnic charge means for igniting said preselected ignitable surface portions of pyrotechnic charge; a hollow conical shell member in thermal energy transfer relationship to said preselected ignitable surface portions of pyrotechnic charge member for receiving said thermal energy and adapted to emit electromagnetic radiation; and means for limiting the amount of said emitted electromagnetic radiation transferred to regions outside the cavity radiator.

18. The cavity radiator as defined in claim 17 wherein said squib means is electrically energized.

19. The cavity radiator as defined in claim 17 wherein said squib means is parasitically energized.

20. In a cavity radiator, an improved cavity electromagnetic radiation source of the kind adapted to receive thermal energy and emit electromagnetic radiation in predetermined wavelengths comprising, in combination: means for generating thermal energy; a body member having surface portions and transparent to electromagnetic radiation having energy in the predetermined wavelengths; and an opaque electromagnetic radiation emitting coating means coupled to preselected areas of said surface portions for receiving thermal energy and generating electromagnetic radiation in the predetermined wave lengths to transmit electromagnetic radiation through said body member.

21. In a cavity radiator, an improved cavity electromagnetic radiation source of the kind adapted to receive thermal energy and emit electromagnetic radiation in predetermined wavelengths comprising, in combination: means for generating thermal energy; a solid right circular conical member having a conical surface portion and transparent to electromagnetic radiation having energy in the predetermined wavelengths; and an opaque electromagnetic radiation emitting coating means coupled to said conical surface portion for receiving thermal energy and generating electromagnetic radiation in the predetermined wave lengths to transmit electromagnetic radiation through said conical member.

22. In a cavity radiator, an improved cavity electromagnetic radiation source of the kind adapted to receive thermal energy and emit electromagnetic radiation in predetermined wavelengths comprising, in combination: means for generating thermal energy; a solid right circular conical member transparent to electromagnetic radiation having energy in the preselected wavelengths and having a conical surface portion and an opaque coating of chromic oxide between 2 and 4 microns thick coupled to said conical surface portion for receiving thermal energy and generating electromagnetic radiation in the predetermined wave lengths to transmit electromagnetic radiation through said conical member.

23. The cavity radiation source as defined in claim 22 wherein said solid right circular conical member is fused quartz.

24. The cavity radiation source defined in claim 22 wherein said solid right circular conical member is sapphire.

25. A cavity radiator comprising, in combination: a pyrotechnic charge means for generating thermal energy; an ignition means oriented with respect to said pyrotechnic charge means for igniting said pyrotechnic charge means; a solid body member transparent to electromagnetic radiation having energy in predetermined wavelengths and having predetermined surface portions; and an opaque electromagnetic radiation emitting coating means defining a cavity radiation source surface and coupled to preselected areas of said surface portions of said body member and oriented to receive said thermal energy for emitting electromagnetic radiation having energy in at least said predetermined wavelengths.

26. A cavity radiator comprising, in combination: a pyrotechnic charge means for generating thermal energy; an ignition means oriented with respect to said pyrotechnic charge means for igniting said pyrotechnic charge means; a solid body member transparent to electromagnetic radiation having energy in predetermined wavelengths and having surface portions; an opaque electromagnetic radiation emitting coating means defining a cavity radiation source surface and coupled to preselected areas of said surface portions of said body member and oriented to receive said thermal energy for emitting electromagnetic radiation having at least in said predetermined wavelengths; and means for limiting the amount of said electromagnetic radiation transferred to regions outside the cavity radiator.

27. A cavity radiator comprising, in combination: a pyrotechnic charge means for generating thermal energy and remaining substantially intact during and after combustion; a squib means oriented with respect to said pyrotechnic charge means for igniting said pyrotechnic charge means; a right circular conical body member having a conical surface portion and transparent to predetermined wavelengths of electromagnetic radiation; an opaque electromagnetic radiation emitting coating means defining a cavity radiation source surface and coupled to said conical surface portion of said body member in thermal energy receiving relationship to said pyrotechnic charge means for emitting electromagnetic radiation having energy at least in the predetermined wavelengths; and means for limiting the amount of said electromagnetic radiation transferred to regions exterior the cavity radiator.

28. The cavity radiator as defined in claim 27 wherein the conical surface portion is roughened.

29. The lavity radiator as defined in claim 27 wherein said right circular conical body member is quartz.

30. The cavity radiator as defined in claim 27 wherein said right circular conical body member is sapphire.

31. A cavity radiator comprising, in combination: a solid right circular conical body member transparent to predetermined wavelengths of electromagnetic radiation and having a conical surface portion and a base portion; an opaque radiation emitting coating means defining a cavity radiation source surface coupled to preselected areas of said conical surface portion for generating electromagnetic radiation; a pyrotechnic charge means having walls defining an ignitable surface portion, a peripheral surface portion, and a first and a second end surface portion; a thin layer of primer mix intermediate said radiation emitting coating means and said ignitable surface portion; a closure disc member having walls defining a generally circular aperture wherein said aperture is coaxially aligned with said base portion of said body member for transmitting said electromagnetic radiation and said closure disc member is adjacent said first end surface of said pyrotechnic charge member; a generally cylindrical housing member adjacent said peripheral surface portions of said pyrotechnic charge member and coupled to said closure disc; a first combustion inhibitor means intermediate said peripheral surface portions and said housing member and intermediate said closure disc and said first end surface; an end plate coupled to said housing member and adjacent said second end surface and a second combustion inhibitor means intermediate therebetween; and a squib means coupled to said end plate and in ignition relationship to said primer mix for igniting said primer mix.

32. The cavity radiator as defined in claim 31 wherein said solid right circular conical body member is quartz.

33. The cavity radiator as defined in claim 31 wherein said solid right circular conical body member is sapphire.

34. The cavity radiator as defined in claim 31 wherein said opaque radiation emitting coating means is chromic oxide between 2 and 4 microns thick.

35. The cavity radiator as defined in claim 31 wherein said squib means is electrically energized.

36. In a cavity radiator, the improvement comprising, in combination: a pyrotechnic charge means having surface portions defining a cavity radiation source surface for emitting electromagnetic radiation and remaining intact during and after combustion; squib means oriented in ignition relationship to said pyrotechnic charge means for ignition said pyrotechnic charge means; body means transparent to predetermined wavelengths of electromagnetic radiation oriented in electromagnetic radiation receiving relationship to said pyrotechnic charge means for transmitting said emitted electromagnetic radiation in said predetermined wavelengths; and means for limiting the amount of said transmited electromagnetic radiation transferred to regions external the cavity radiator.

37. The cavity radiator as defined in claim 36 wherein said squib means is electrically energized.

38. The cavity radiator as defined in claim 36 wherein said squib means is parasitically energized.

39. The cavity radiator as defined in claim 36 wherein said body means is a sapphire hyperhemisphere.

40. In a cavity radiator, the improvement comprising, in combination: a pyrotechnic charge means for generating thermal energy and remaining intact during and after combustion; ignition means oriented in ignition relationship to said pyrotechnic charge means for igniting said pyrotechnic charge means; an opaque metallic oxide cavity radiation source in thermal energy transfer relationship to said pyrotechnic charge means for receiving said thermal energy and generating electromagnetic radiation; and means for limiting the amount of said electromagnetic radiation that is transferred to regions exterior the cavity radiator.

41. The cavity radiator as defined in claim 40 wherein said cavity radiation source is aluminum oxide.

42. In a cavity radiator, the improvement comprising, in combination: a pyrotechnic charge means for generating thermal energy and remaining intact during and after combustion; ignition means oriented in ignition relationship to said pyrotechnic charge means for igniting said pyrotechnic charge means; and an opaque metallic oxide cavity radiation source in thermal energy transfer relationship to said pyrotechnic charge means for receiving said thermal energy and generating electromagnetic radiation.

References Cited by the Examiner

UNITED STATES PATENTS

| | | | |
|---|---|---|---|
| 2,933,317 | 4/1960 | Pittinger et al. | 250—85 |
| 2,952,762 | 9/1960 | Williams et al. | 250—85 |
| 2,972,053 | 2/1961 | Anderson | 250—85 X |
| 3,021,784 | 2/1962 | Meddick | 102—20 |

RALPH G. NILSON, *Primary Examiner.*

ARTHUR GAUSS, GEORGE N. WESTBY, *Examiners.*

P. J. SCHLESINGER, S. CHATMON, JR., G. E MATTHEWS, W. F. LINDQUIST,
*Assistant Examiners*